United States Patent
Yin et al.

(10) Patent No.: US 9,509,201 B2
(45) Date of Patent: Nov. 29, 2016

(54) EASY-TO-START MOTOR INCLUDING A METALLIC INDUCTION MEMBER WRAPPED WITH A PLASTIC MEMBER AND A BASE THEREOF

(71) Applicant: Sunonwealth Electric Machine Industry Co., Ltd., Kaohsiung (TW)

(72) Inventors: Tso-Kuo Yin, Kaohsiung (TW); Duo-Nian Shan, Kaohsiung (TW); Tian-Xuan Wang, Kaohsiung (TW); Shit-Chin Wu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 451 days.

(21) Appl. No.: 14/068,058

(22) Filed: Oct. 31, 2013

(65) Prior Publication Data
US 2014/0203680 A1  Jul. 24, 2014

(30) Foreign Application Priority Data
Jan. 24, 2013  (TW) .............................. 102102637 A (51) Int. Cl.
*H02K 1/27* (2006.01)
*H02K 29/03* (2006.01)
*H02K 21/24* (2006.01)

(52) U.S. Cl.
CPC ............ *H02K 29/03* (2013.01); *H02K 1/2793* (2013.01); *H02K 21/24* (2013.01)

(58) Field of Classification Search
CPC .............................. H02K 1/2793; H02K 1/27
USPC .... 310/156.01, 156.32, 49.55, 67 R, 40 MM
See application file for complete search history.

(56) References Cited

U.S. PATENT DOCUMENTS

| | | | |
|---|---|---|---|
| 7,884,512 B2 | 2/2011 | Horng et al. | |
| 8,072,101 B2 | 12/2011 | Ho | |
| 2006/0232150 A1* | 10/2006 | Horng ...................... | H02K 7/09 310/68 B |
| 2011/0148226 A1* | 6/2011 | Horng .................... | H02K 21/02 310/156.43 |

FOREIGN PATENT DOCUMENTS

| | | |
|---|---|---|
| CN | 102075051 A | 5/2011 |
| TW | I287909 B | 10/2007 |

* cited by examiner

*Primary Examiner* — Michael Andrews
(74) *Attorney, Agent, or Firm* — Alan D. Kamrath; Kamrath IP Lawfirm, P.A.

(57) ABSTRACT

An easy-to-start motor includes a base, a stator and a rotor. The base has a plastic member and a metallic induction member wrapped with the plastic member. The metallic induction member includes at least one magnetic attraction portion. Each magnetic attraction portion is in the form of a protrusion. The stator is coupled with the base. The rotor has a shaft and a permanent magnet. The shaft is capable of being coupled with the base. The at least one magnetic attraction portion is magnetically attracted by the permanent magnet, to prevent the rotor from stopping at a dead location where it is difficult to start the motor. A base of the easy-to-start motor is adapted to be coupled with a rotor, including a plastic member and a metallic induction member wrapped with the plastic member.

26 Claims, 9 Drawing Sheets

EASY-TO-START MOTOR INCLUDING A METALLIC INDUCTION MEMBER WRAPPED WITH A PLASTIC MEMBER AND A BASE THEREOF

BACKGROUND OF THE INVENTION

1. Field of the Invention

The present invention generally relates to an easy-to-start motor and a base thereof and, more particularly, to a motor that has an outstanding electromagnetic shielding effect and that is able to prevent itself from stopping at a dead location where it is difficult to start the motor, as well as a base thereof.

2. Description of the Related Art

Figure 1:
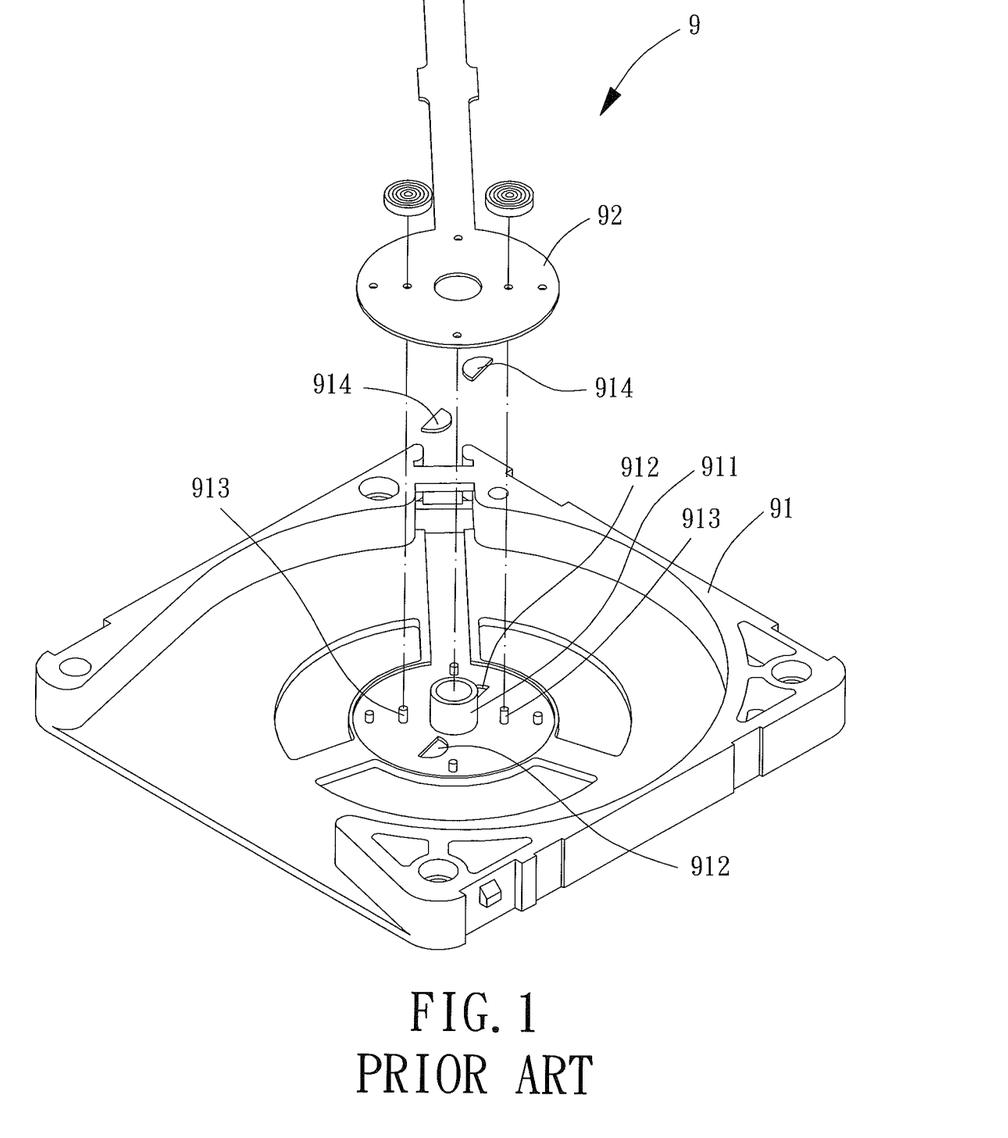
FIG. 1 is an exploded view of a conventional structure for fixing a printed circuit board in a miniaturized motor.

FIG. 1 shows a structure for fixing a printed circuit board in a miniaturized motor disclosed by Taiwan Patent Application No. 96108993. Structure 9 includes a base 91 and a printed circuit board 92. A shaft tube 911 is mounted on a center of base 91. Base 91 further includes a plurality of recesses 912 and a plurality of positioning posts 913 surrounding shaft tube 911. A sensing plate 914 is mounted in each recess 912. Printed circuit board 92 is fitted around shaft tube 911 and securely mounted on base 91, thereby pressing sensing plates 914. Structure 9 can be installed in a motor to position the rotor of the motor in a proper location, allowing the motor to be started easily through the use of sensing plates 914.

Disadvantageously, it is required to arrange recesses 912 in order to receive sensing plates 914. Due to the arrangement of recesses 912, base 91 has a smaller thickness where recesses 912 are arranged, affecting the overall structural strength of base 91.

In addition, it is still required to mount the plurality of positioning posts 913 on base 91 in order for printed circuit board 92 to be securely mounted on base 91 and to firmly press sensing plates 914, preventing sensing plates 914 from disengaging from base 91. However, the plurality of positioning posts 913 is liable to crack or break after printed circuit board 92 is positioned thereon for a long duration of time. As a result, the plurality of positioning posts 913 is no longer able to effectively support printed circuit board 92. Disadvantageously, printed circuit board 92 is not able to prevent the disengagement of sensing plates 914 from base 91. Thus, structure 9 is not able to provide a secure fixing effect for sensing plates 914.

Since base 91 is made of plastic material in injection molding, base 91 is not able to provide an electromagnetic shielding effect when structure 9 is installed in an electronic device. Although sensing plates 914 are made of metal, the ability of sensing plates 914 to block electromagnetic fields is insufficient. As a result, the electromagnetic field generated during the operation of structure 9 could affect the operations of the electronic elements in the electronic device, leading to an unstable operation of the electronic device.

SUMMARY OF THE INVENTION

It is therefore the objective of this invention to overcome the above problems by providing an easy-to-start motor having a base formed by a plastic member and a metallic induction member wrapped with the plastic member by way of molding. As such, the base has an improved structural strength.

It is another objective of this invention to provide an easy-to-start motor which prevents the metallic induction member from disengaging from the base of the motor.

It is a further objective of this invention to provide a base of an easy-to-start motor which is able to provide an effective electromagnetic shielding effect via the metallic induction member of the base. Thus, when the motor is installed in an electronic device, the electronic device is immune to electromagnetic interference.

In an embodiment of the invention, an easy-to-start motor includes a base, a stator and a rotor. The base has a plastic member and a metallic induction member wrapped with the plastic member by way of molding. The metallic induction member includes at least one magnetic attraction portion. Each magnetic attraction portion is in the form of a protrusion. The stator is coupled with the base. The rotor has a shaft and a permanent magnet. The shaft is capable of being coupled with the base. The at least one magnetic attraction portion is magnetically attracted by the permanent magnet, to prevent the rotor from stopping at a dead location where it is difficult to start the motor.

In a preferred form shown, the metallic induction member is in the form of a plate having an incomplete circular shape.

In the preferred form shown, the permanent magnet of the rotor comprises a plurality of N poles and a plurality of S poles formed by way of magnetization. Each magnetic attraction portion magnetically attracts a respective one of the plurality of N or S poles.

In the preferred form shown, each magnetic attraction portion has an outer edge. The pluralities of N and S poles have a minimal circumferential length in a circumferential direction of the permanent magnet, and the outer edge has a length smaller than the minimal circumferential length.

In the preferred form shown, the quantity of the at least one magnetic attraction portion is smaller than or equal to that of the pluralities of N and S poles of the permanent magnet.

In the preferred form shown, the metallic induction member comprises a first face and a second face opposing to the first face. The first face faces the rotor. Each magnetic attraction portion forms the protrusion on the first face and a recess on the second face.

In the preferred form shown, each magnetic attraction portion has a magnetic attraction face facing the permanent magnet of the rotor. The magnetic attraction face is spaced from the permanent magnet at a first axial distance, the first face is spaced from the permanent magnet at a second axial distance, and the second axial distance is larger than the first axial distance.

In the preferred form shown, the plastic member forms at least one exposed portion. Each exposed portion is aligned with the magnetic attraction face of a corresponding magnetic attraction portion, and the magnetic attraction face protrudes from a surface of the plastic member via a corresponding one of the at least one exposed portion.

In the preferred form shown, the magnetic attraction face of each magnetic attraction portion is covered within the plastic member in an integral manner.

In the preferred form shown, an outer periphery, the first face and the at least one magnetic attraction portion of the metallic induction member are covered within the plastic member in an integral manner.

In the preferred form shown, an outer periphery, the second face and the at least one magnetic attraction portion of the metallic induction member are covered within the plastic member in an integral manner.

In the preferred form shown, an outer periphery, the first face, the second face and the at least one magnetic attraction portion of the metallic induction member are covered within the plastic member in an integral manner.

In the preferred form shown, the plastic member has a shaft-coupling portion, and the shaft of the rotor is rotatably coupled with the shaft-coupling portion.

In the preferred form shown, the metallic induction member comprises a through hole. The shaft-coupling portion of the plastic member is aligned with the through hole and integrally formed with a circumferential wall of the through hole.

In the preferred form shown, the metallic induction member comprises at least one notch. Each notch forms a receiving portion after the metallic induction member is wrapped with the plastic member.

In the preferred form shown, the stator is spaced from the permanent magnet of the rotor by an axial air gap.

In the preferred form shown, the stator is spaced from the permanent magnet of the rotor by a radial air gap In another embodiment of the invention, a base of an easy-to-start motor is adapted to be rotatably coupled with a rotor. The base comprises a plastic member and a metallic induction member wrapped with the plastic member. The metallic induction member comprises at least one magnetic attraction portion magnetically attractive to a permanent magnet of the rotor, to prevent the rotor from stopping at a dead location where it is difficult to start the motor. Each magnetic attraction portion is in the form of a protrusion.

In a preferred form shown, each magnetic attraction portion has a magnetic attraction face, and the magnetic attraction face of each magnetic attraction portion is covered within the plastic member in an integral manner.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
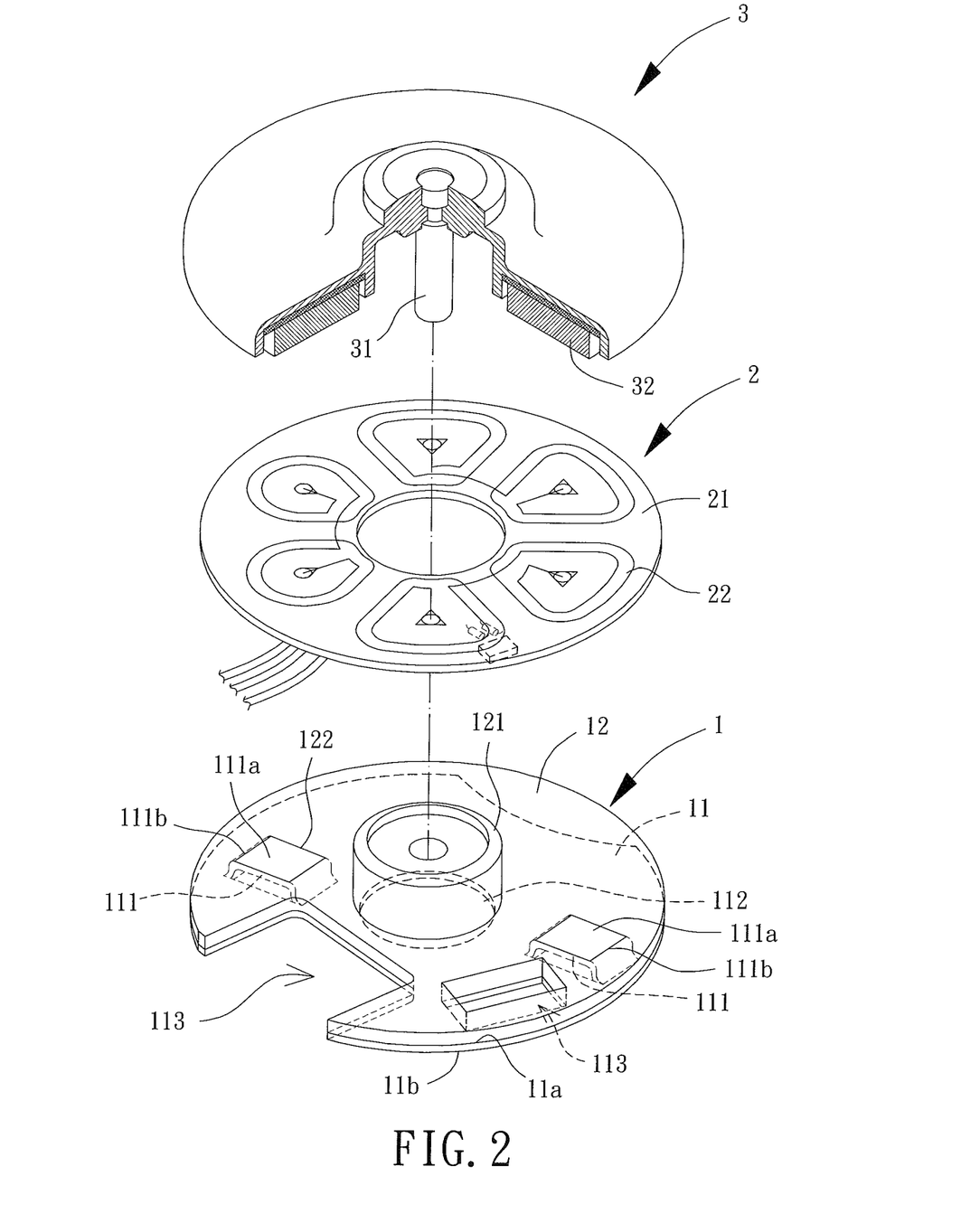
FIG. 2 is an exploded view of an easy-to-start motor according to a preferred embodiment of the invention.

FIG. 2 shows an easy-to-start motor which includes a base 1, a stator 2 and a rotor 3 according to a preferred embodiment of the invention. Stator 2 is mounted on base 1 and drives rotor 3 to rotate. Rotor 3 is rotatably coupled with base 1.

Figure 3:
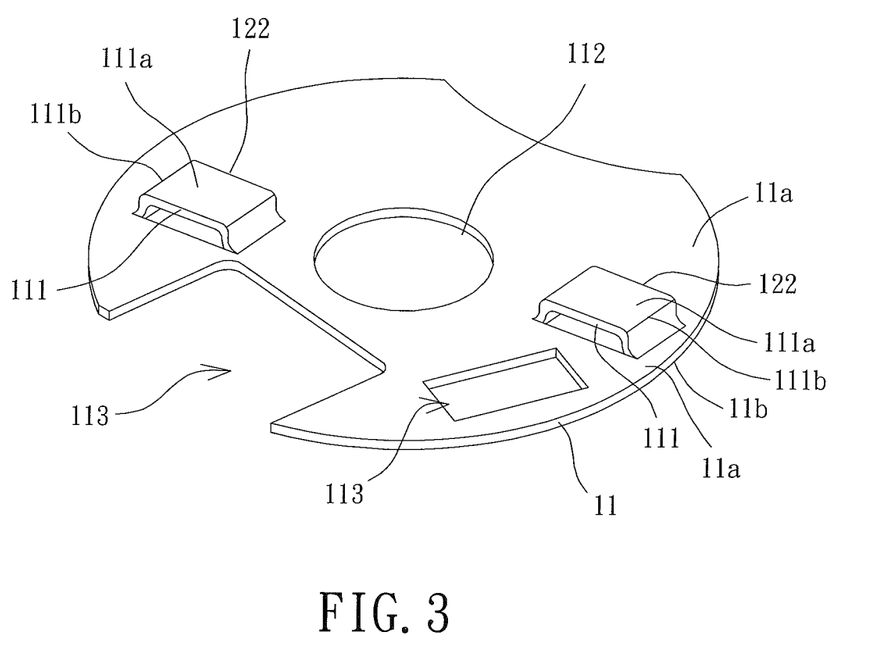
FIG. 3 shows a metallic induction member of the motor of the invention.

Base 1 includes a metallic induction member 11 and a plastic member 12. Referring to FIGS. 2 and 3, metallic induction member 11 includes one or more magnetic-attracting portions 111. The quantity and shape of magnetic attraction portion(s) 111 are determined to provide mutual magnetic attraction between magnetic-attracting portion(s) 111 and a permanent magnet 32 of rotor 3, so that rotor 3 is able to stop at a proper location where it is easy to start rotor 3. Metallic induction member 11 is wrapped with plastic member 12 (by way of molding) which has a shaft-coupling portion 121. Shaft-coupling portion 121 is any structure that can be coupled with rotor 3. For example, shaft-coupling portion 121 may be formed from metallic induction member 11. In the embodiment, shaft-coupling portion 121 is in the form of a shaft tube capable of receiving devices such as a bearing, so that rotor 3 can be rotatably coupled with shaft-coupling portion 121. However, the structure of shaft-coupling portion 121 is not limited to what has been described above.

Stator 2 is mounted on base 1 and is preferably fitted around shaft-coupling portion 121 of base 1. Stator 2 can be of any structure capable of driving rotor 3 to rotate. In this embodiment, stator 2 includes a circuit board 21. One or more coil layers 22 may be arranged on circuit board 21 by layout or electroforming. For instance, circuit board 21 may be formed by a plurality of layers of printed coils or a plurality of coil layers stacking together. Coil layer(s) 22 may or may not protrude from the surface of circuit board 21.

Rotor 3 has a shaft 31 and the permanent magnet 32. Shaft 31 is rotatably coupled with shaft-coupling portion 121 of base 1. Permanent magnet 32 is magnetically attractive to at least one magnetic attraction portion 111 of metallic induction member 11, to prevent rotor 3 from stopping at a dead location where it is difficult to start rotor 3. Stator 2 is able to generate an alternating magnetic field in order to drive rotor 3 to rotate. The detailed structures of stator 2 and rotor 3, as well as the principle on how stator 2 drives rotor 3 to rotate, are of conventional skills and therefore are not described herein again.

Figure 4:
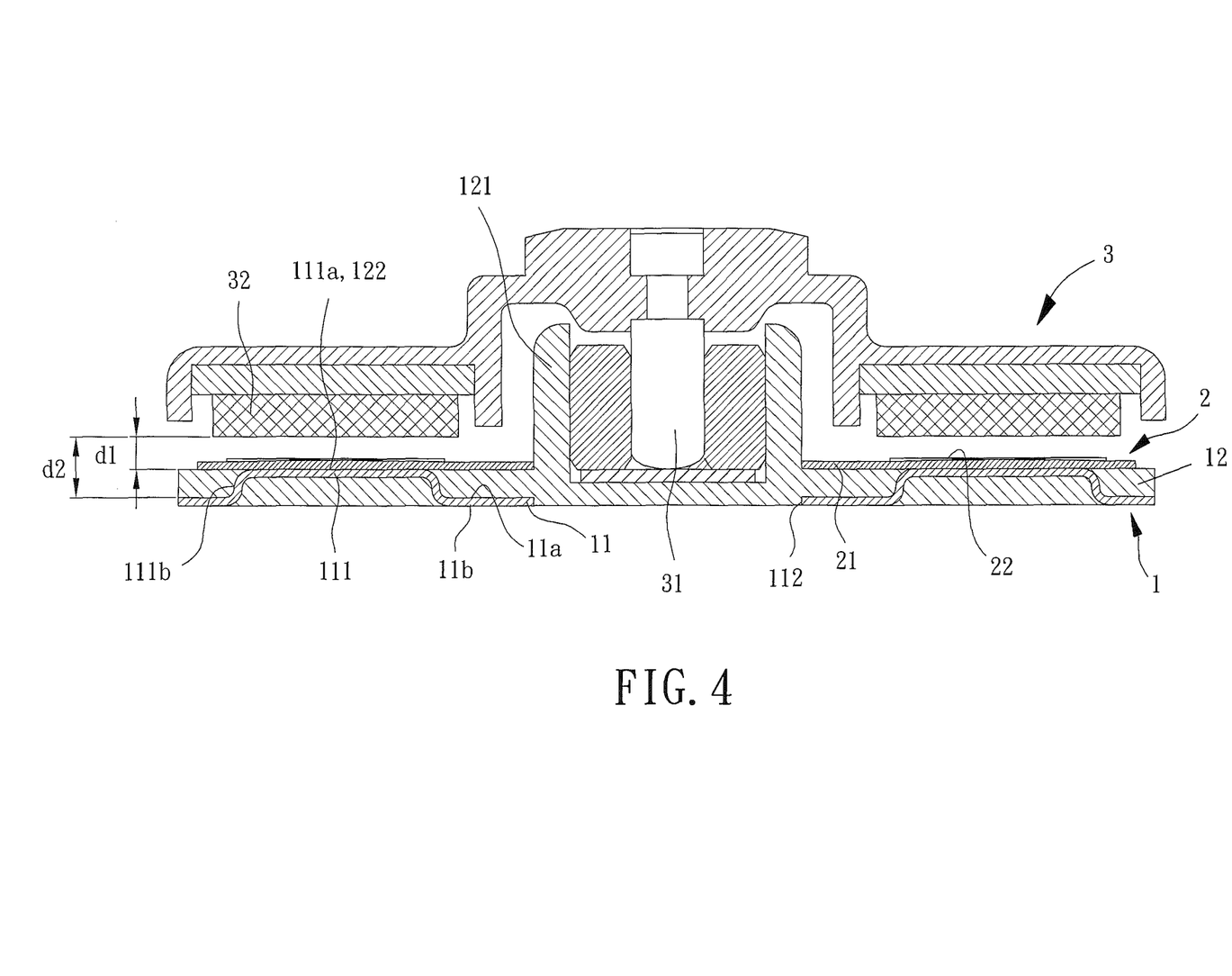
FIG. 4 is a cross-sectional view of the motor having one or more coil layers.

Referring to FIGS. 3 and 4, metallic induction member 11 includes a first face 11a and a second face 11b opposing to first face 11a. First face 11a faces permanent magnet 32 of rotor 3. Metallic induction member 11 includes two magnetic attraction portions 111. The two magnetic attraction portions 111 may be arranged on metallic induction member 11 along a periphery of said member 11 at two opposing locations in the radial direction. Each magnetic attraction portion 111 forms a protrusion on first face 11a and a recess on second face 11b. Specifically, each magnetic attraction portion 111 has a magnetic attraction face 111a facing permanent magnet 32 of rotor 3. Magnetic attraction face 111a is spaced from permanent magnet 32 at an axial distance d1, and first face 11a is spaced from permanent magnet 32 at an axial distance d2. Axial distance d2 is larger than axial distance d1. In this arrangement, magnetic attraction portions 111 are relatively close to permanent magnet 32, such that an improved magnetic attraction effect between magnetic attraction portions 111 and permanent magnet 32 is achieved. Advantageously, the motor can be started easily.

Metallic induction member 11 is preferably in the form of a plate having an incomplete circular shape, to magnetically attract a magnetic pole of rotor 3 more accurately. This prevents rotor 3 from stopping at a dead location where it is difficult to start the motor. For example, referring to FIGS. 2 and 6, each magnetic attraction portion 111 has an outer edge 111b. Permanent magnet 32 of rotor 3 includes a plurality of N poles 321 and a plurality of S poles 322 formed by way of magnetization. The magnetization of permanent magnet 32 and the determination on the number of magnetic poles are not described herein, as it can be readily appreciated by one skilled in the art.

Figure 6:
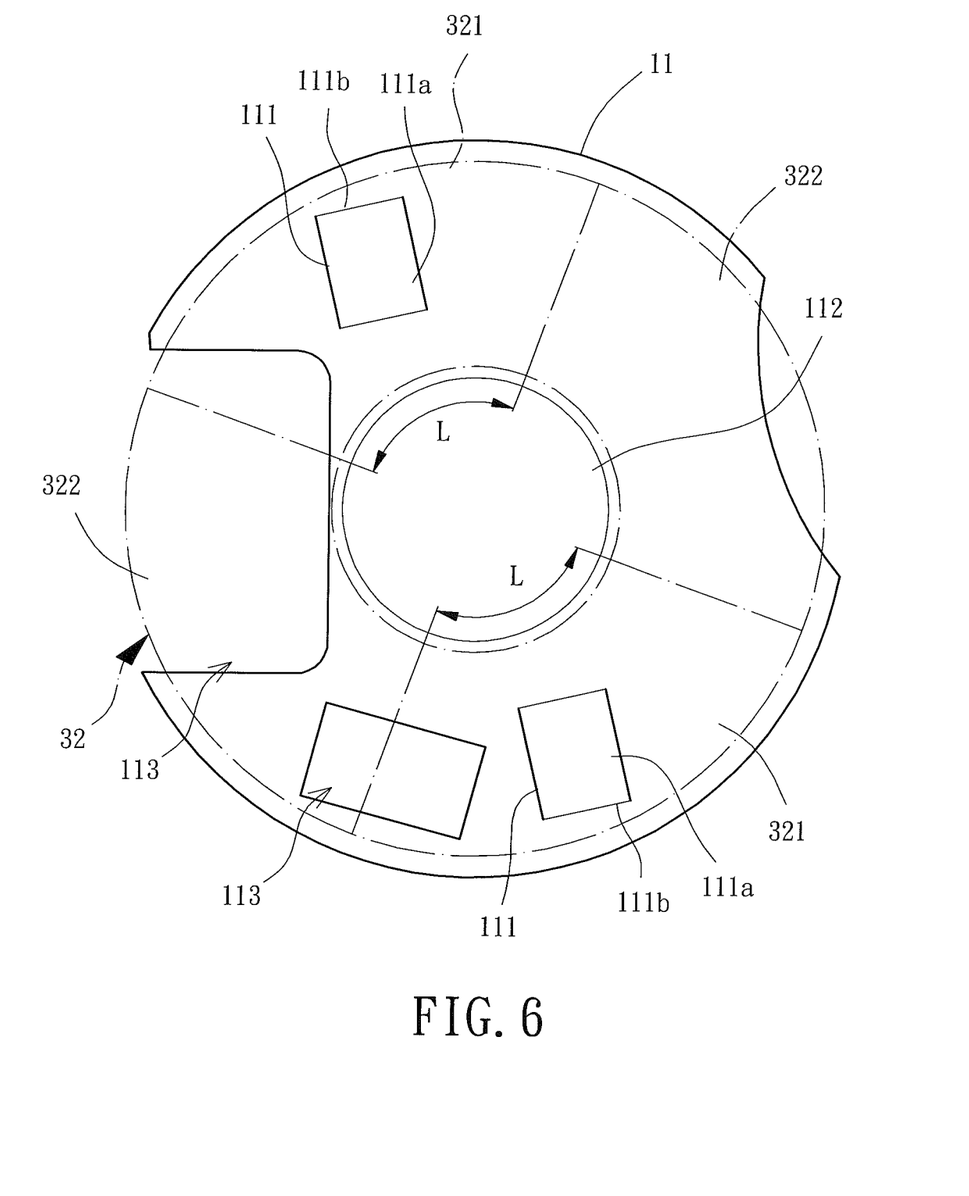
FIG. 6 is a top view showing the relation of a permanent magnet in regard to a metallic induction member of a base.

The quantity of magnetic attraction portion(s) 111 of metallic induction member 11 is preferably smaller than or equal to that of the magnetic poles of permanent magnet 32, so that each magnetic attraction portion 111 is able to magnetically attract a respective pole 321 or 322. The N poles 321 and S poles 322 have a minimal circumferential length L in a circumferential direction of permanent magnet 32. The length of outer edge 111b of magnetic attraction portion 111 is preferably smaller than minimal circumferential length L. Based on the incomplete circular shape of metallic induction member 11, each magnetic attraction portion 111 is able to magnetically attract a corresponding pole 321 or 322 of rotor 3. Magnetic attraction portion 111 is aligned with its corresponding pole 321 or 322 when magnetically attracting the pole 321 or 322. As such, an improved magnetic attraction effect is achieved, preventing rotor 3 from stopping at a dead location where it is difficult to start rotor 3.

In the preferred embodiment, as shown in FIGS. 3 and 4, metallic induction member 11 preferably includes a through hole 112. After metallic induction member 11 is wrapped with plastic member 12, shaft-coupling portion 121 of plastic member 12 is aligned with the through hole 112 and integrally formed with a circumferential wall of the through hole 112. In this arrangement, plastic member 12 is able to form shaft-coupling portion 121 with enhanced structural strength. Furthermore, metallic induction member 11 preferably includes at least one notch 113 which forms at least one receiving portion after metallic induction member 11 is wrapped with plastic member 12. The receiving portion is able to receive a variety of electronic elements (such as a Hall sensor, an electrical connection port, etc. . . . ), to prevent the electronic elements from occupying a larger space. Advantageously, miniaturization of the motor is achieved.

Figure 5:
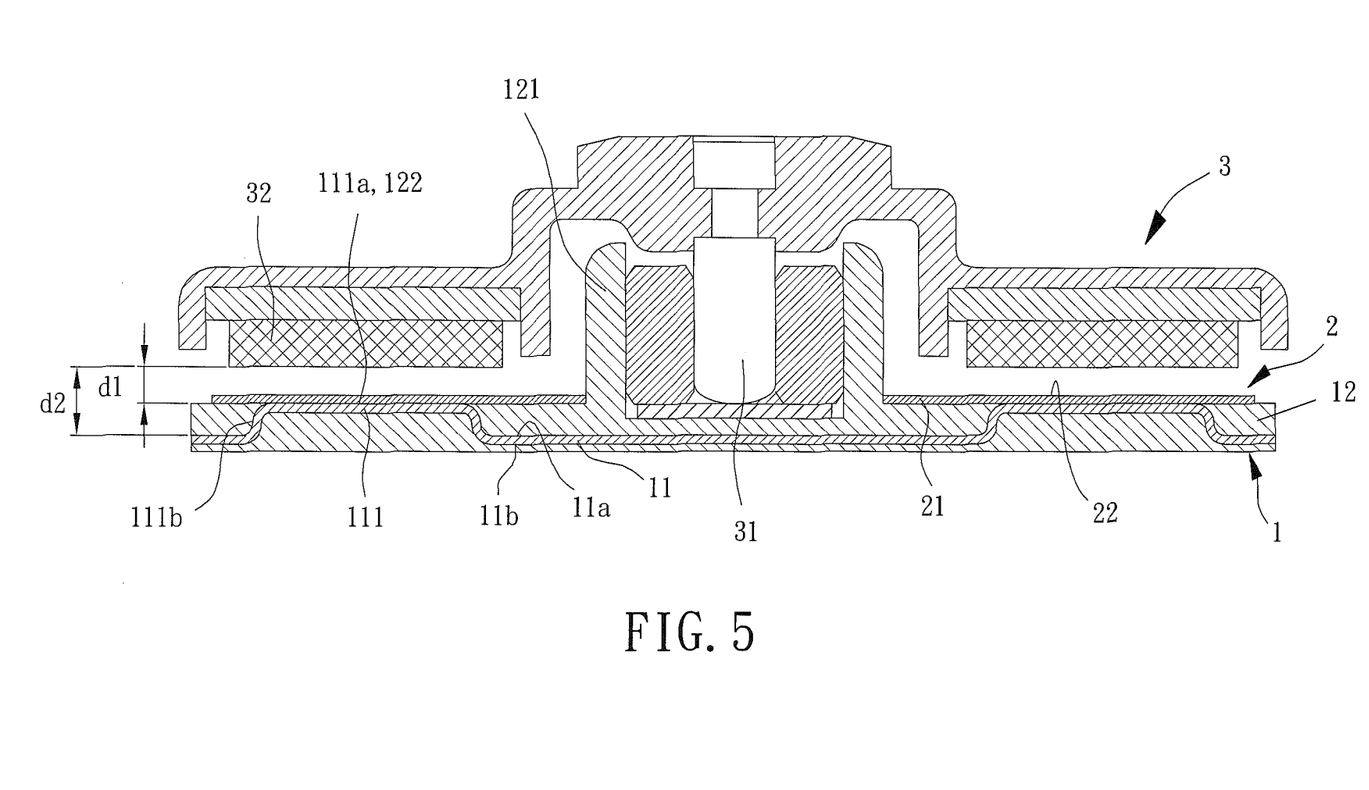
FIG. 5 is a cross-sectional view of the motor without the coil layer(s).

Optionally, referring to FIG. 4, metallic induction member 11 may be wrapped with plastic member 12 in an integral manner where its outer periphery, first face 11a and magnetic attraction portion 111 are covered within plastic member 12. Alternatively, metallic induction member 11 may also be wrapped with plastic member 12 in an integral manner where its outer periphery, second face 11b and magnetic attraction portion 111 are covered within plastic member 12. Alternatively, referring to FIG. 5, metallic induction member 11 may be designed without any through hole 112, coil layer(s) 22 may not protrude from the surface of circuit board 21, and metallic induction member 11 may be wrapped with plastic member 12 in an integral manner where its outer periphery, first face 11a, second face 11b and magnetic attraction portion 111 are covered within plastic member 12. As such, metallic induction member 11 and plastic member 12 can be firmly coupled with each other.

Figure 7:
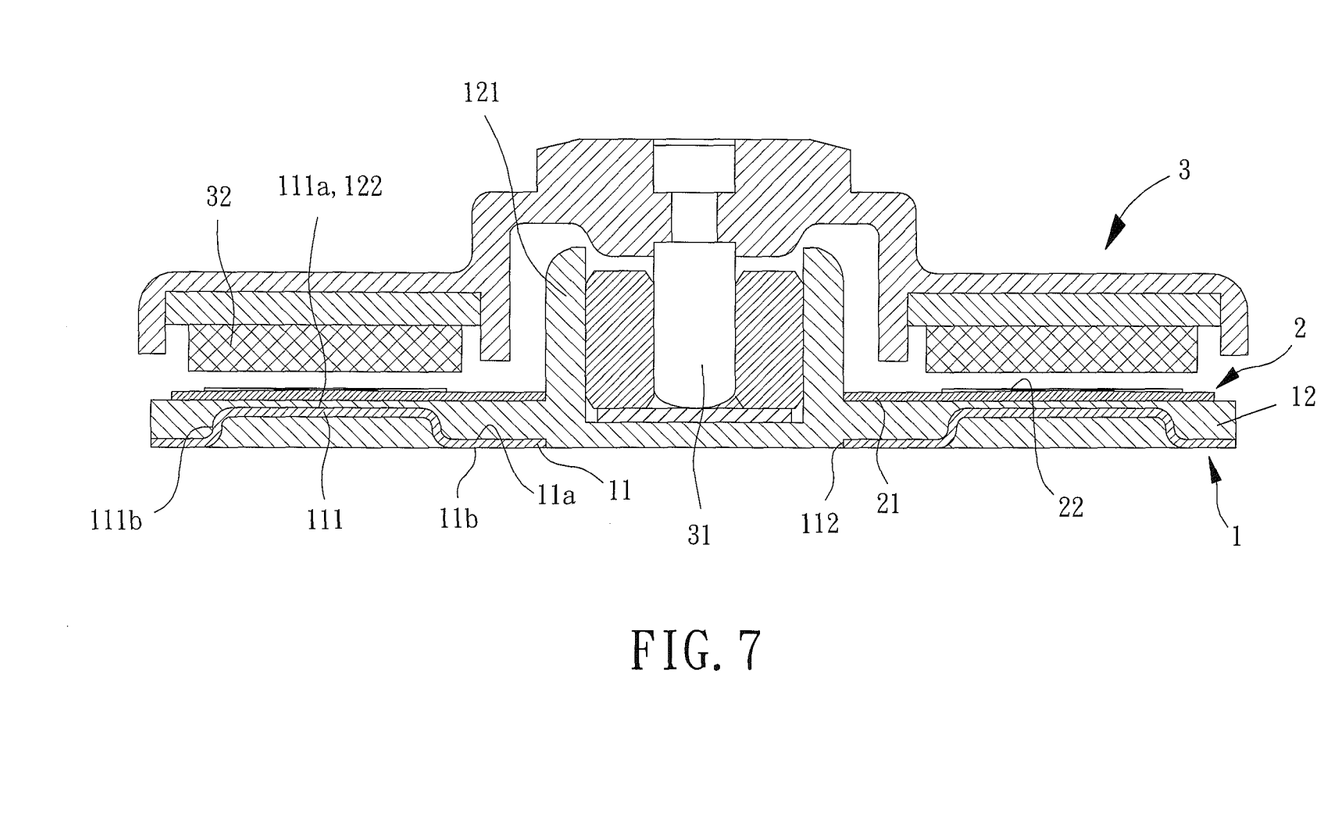
FIG. 7 is a cross-sectional view of the motor wherein a plurality of magnetic-attracting portions is completely covered within a plastic member of the base.

In this embodiment, as shown in FIGS. 2 and 4, plastic member 12 may form at least one exposed portion 122 after metallic induction member 11 is wrapped with plastic member 12. Each exposed portion 122 is aligned with a corresponding magnetic attraction portion 111. In other words, plastic member 12 may not cover magnetic attraction face 111a of each magnetic attraction portion 111. At this time, magnetic attraction face 111a of each magnetic attraction portion 111 may be exposed to air via exposed portion 122 of plastic member 12 (i.e. protrude from a surface of plastic member 12). In this arrangement, magnetic attraction face 111a of each magnetic attraction portion 111 may have an improved magnetic attraction effect with respect to permanent magnet 32. Alternatively, as shown in FIG. 7, magnetic attraction faces 111a of magnetic attraction portions 111 may also be covered within plastic member 12.

Figure 8:
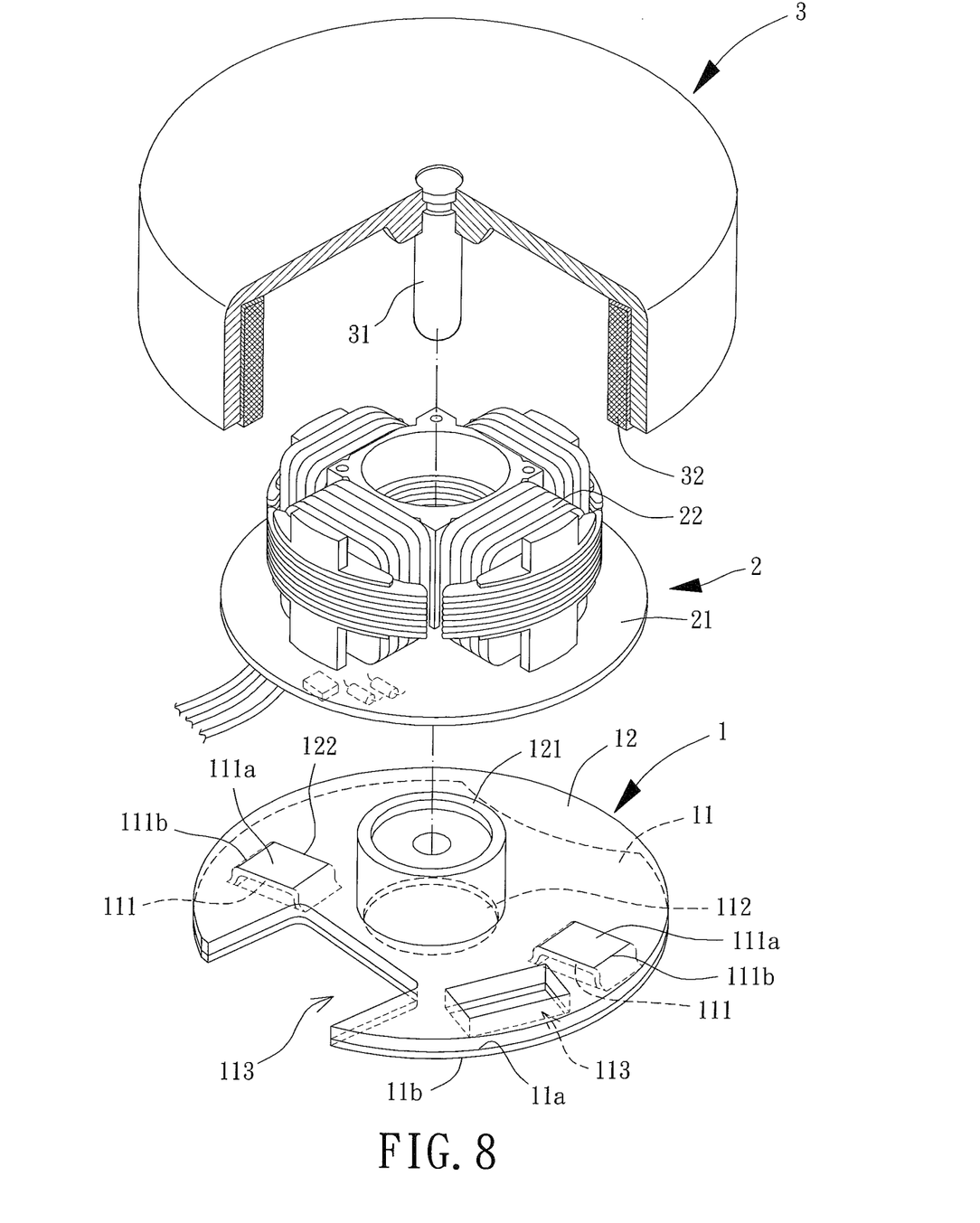
FIG. 8 is an exploded view of a motor having a radial air gap in which the permanent magnet and the metallic induction member are installed in the motor.
Figure 9:
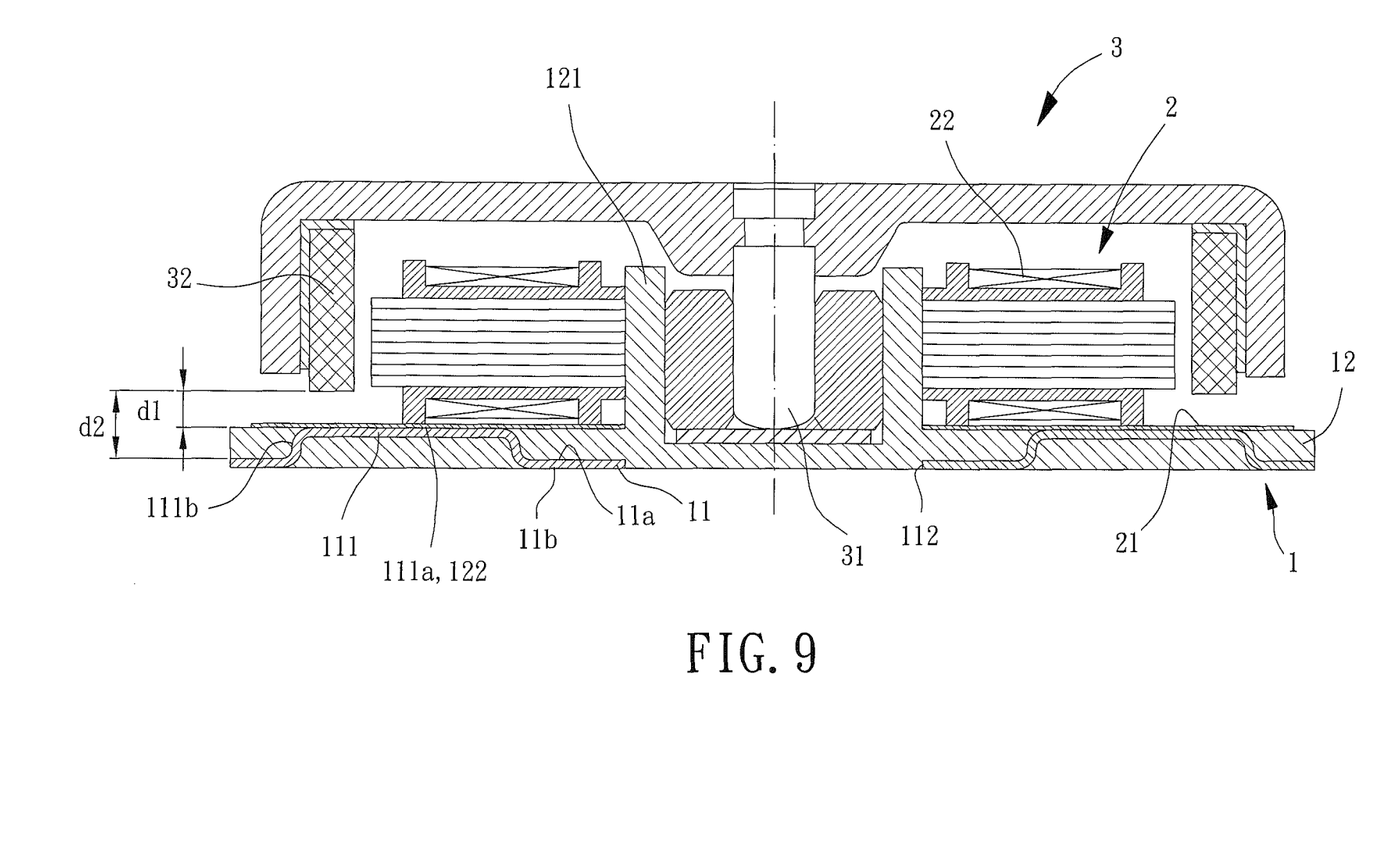
FIG. 9 is a cross-sectional view of the motor having the radial air gap in which the permanent magnet and the metallic induction member are installed in the motor.

Based on the mechanical structures of the motor and its base, the motor can be applied to a cooling fan to drive an impeller to rotate. As such, the cooling fan can be installed in any kind of electronic devices for cooling purposes. The principle on how the motor drives the impeller to rotate is of conventional skill and therefore is not described herein. In FIGS. 2, 4, 5 and 7, the motors are implemented with axial air gaps. Namely, stator 2 is spaced from permanent magnet 32 of rotor 3 by an axial air gap. Alternatively, as shown in FIGS. 8 and 9, the motor is implemented with a radial air gap. Namely, stator 2 is spaced from permanent magnet 32 of rotor 3 by a radial air gap. Thus, the invention can be implemented in various motors.

It can be recognized from the above description that, since base 1 has metallic induction member 11, rotor 3 can be efficiently prevented from stopping at a dead location when magnetic attraction portion(s) 111 of metallic induction member 11 faces permanent magnet 32 of rotor 3. Thus, it can be ensured that the motor can be started easily. In addition, since plastic member 12 covers the entire surface of metallic induction member 11, it can prevent metallic induction member 11 from disengaging from base 1 while enhancing the structural strength of base 1. Furthermore, the contact area between plastic member 12 and metallic induction member 11 can be increased via the arrangement of magnetic attraction portion(s) 111. As a result, a secure engagement between plastic member 12 and metallic induction member 11 is achieved.

Moreover, since metallic induction member 11 is wrapped with plastic member 12 in a large area, metallic induction member 11 is able to provide a wide-range electromagnetic shielding function when the motor of the invention is installed in an electronic device. Advantageously, it can prevent the electromagnetic field, which is generated during the operation of the motor, from interfering with the electronic elements inside the electronic device. Thus, stable operation of the electronic device is attained.

Although the invention has been described in detail with reference to its presently preferable embodiments, it will be understood by one of ordinary skill in the art that various modifications can be made without departing from the spirit and the scope of the invention, as set forth in the appended claims.

What is claimed is:
1. An easy-to-start motor comprising:
a base having a plastic member and a metallic induction member wrapped with the plastic member, wherein the metallic induction member comprises at least one mag- netic attraction portion, and wherein each of the at least one magnetic attraction portion is in the form of a protrusion;

a stator coupled with the base; and a rotor having a shaft and a permanent magnet, wherein the shaft is capable of being coupled with the base, wherein the at least one magnetic attraction portion is magnetically attracted by the permanent magnet, to prevent the rotor from stopping at a dead location where the rotor is difficult to start rotation, wherein the metallic induction member comprises a first face and a second face opposing to the first face, wherein the first face faces the rotor, and wherein each of the at least one magnetic attraction portion forms the protrusion on the first face and a recess on the second face.

2. The easy-to-start motor as claimed in claim 1, wherein the metallic induction member is in the form of a plate having an incomplete circular shape.

3. The easy-to-start motor as claimed in claim 2, wherein the permanent magnet of the rotor comprises a plurality of N poles and a plurality of S poles formed by way of magnetization, and wherein each of the at least one magnetic attraction portion magnetically attracts a respective one of the plurality of N or S poles.

4. The easy-to-start motor as claimed in claim 3, wherein each of the at least one magnetic attraction portion has an outer edge, wherein the pluralities of N and S poles have a minimal circumferential length in a circumferential direction of the permanent magnet, and wherein the outer edge has a length smaller than the minimal circumferential length.

5. The easy-to-start motor as claimed in claim 3, wherein the quantity of the at least one magnetic attraction portion is smaller than or equal to that of the pluralities of N and S poles of the permanent magnet.

6. The easy-to-start motor as claimed in claim 1, wherein each of the at least one magnetic attraction portion has a magnetic attraction face facing the permanent magnet of the rotor, wherein the magnetic attraction face is spaced from the permanent magnet at a first axial distance, wherein the first face is spaced from the permanent magnet at a second axial distance, and wherein the second axial distance is larger than the first axial distance.

7. The easy-to-start motor as claimed in claim 6, wherein the plastic member forms at least one exposed portion, wherein each of the at least one exposed portion is aligned with the magnetic attraction face of a corresponding one of the at least one magnetic attraction portion, and wherein the magnetic attraction face protrudes from a surface of the plastic member via a corresponding one of the at least one exposed portion.

8. The easy-to-start motor as claimed in claim 6, wherein the magnetic attraction face of each of the at least one magnetic attraction portion is covered within the plastic member in an integral manner.

9. The easy-to-start motor as claimed in claim 1, wherein the metallic induction member is wrapped with the plastic member in an integral manner with an outer periphery, the first face and the at least one magnetic attraction portion of the metallic induction member covered within the plastic member.

10. The easy-to-start motor as claimed in claim 1, wherein the metallic induction member is wrapped with the plastic member in an integral manner with an outer periphery, the second face and the at least one magnetic attraction portion of the metallic induction member covered within the plastic member.

11. The easy-to-start motor as claimed in claim 1, wherein the metallic induction member is wrapped with the plastic member in an integral manner with an outer periphery, the first face, the second face and the at least one magnetic attraction portion of the metallic induction member covered within the plastic member.

12. The easy-to-start motor as claimed in claim 1, wherein the plastic member has a shaft-coupling portion, and wherein the shaft of the rotor is rotatably coupled with the shaft-coupling portion.

13. The easy-to-start motor as claimed in claim 12, wherein the metallic induction member comprises a through hole, and wherein the shaft-coupling portion of the plastic member is aligned with the through hole and integrally formed with a circumferential wall of the through hole.

14. The easy-to-start motor as claimed in claim 1, wherein the metallic induction member comprises at least one notch, wherein each of the at least one notch forms a receiving portion after the metallic induction member is wrapped with the plastic member.

15. The easy-to-start motor as claimed in claim 1, wherein the stator is spaced from the permanent magnet of the rotor by an axial air gap.

16. The easy-to-start motor as claimed in claim 1, wherein the stator is spaced from the permanent magnet of the rotor by a radial air gap.

17. A base of an easy-to-start motor adapted to be coupled with a rotor, comprising:

a plastic member; and a metallic induction member integrally wrapped with the plastic member and comprising at least one magnetic attraction portion magnetically attractive to a permanent magnet of the rotor, so as to prevent the rotor from stopping at a dead location where the rotor is difficult to start rotation, wherein each of the at least one magnetic attraction portion is in the form of a protrusion, wherein the metallic induction member comprises a first face and a second face opposing to the first face, wherein the first face faces the rotor, and wherein each of the at least one magnetic attraction portion forms the protrusion on the first face and a recess on the second face.

18. The base of the easy-to-start motor adapted to be coupled with a rotor as claimed in claim 17, wherein the metallic induction member is in the form of a plate having an incomplete circular shape.

19. The base of the easy-to-start motor adapted to be coupled with a rotor as claimed in claim 17, wherein the metallic induction member is wrapped with the plastic member in an integral manner with an outer periphery, the first face and the at least one magnetic attraction portion of the metallic induction member covered within the plastic member.

20. The base of the easy-to-start motor adapted to be coupled with a rotor as claimed in claim 17, wherein the metallic induction member is wrapped with the plastic member in an integral manner with an outer periphery, the second face and the at least one magnetic attraction portion of the metallic induction member covered within the plastic member.

21. The base of the easy-to-start motor adapted to be coupled with a rotor as claimed in claim 17, wherein the metallic induction member is wrapped with the plastic member in an integral manner with an outer periphery, the first face, the second face and the at least one magnetic attraction portion of the metallic induction member covered within the plastic member.

22. The base of the easy-to-start motor adapted to be coupled with a rotor as claimed in claim 17, wherein the plastic member has a shaft-coupling portion, and wherein the shaft of the rotor is rotatably coupled with the shaft-coupling portion.

23. The base of the easy-to-start motor adapted to be coupled with a rotor as claimed in claim 22, wherein the metallic induction member comprises a through hole, and wherein the shaft-coupling portion of the plastic member is aligned with the through hole and integrally formed with a circumferential wall of the through hole.

24. The base of the easy-to-start motor adapted to be coupled with a rotor as claimed in claim 17, wherein the metallic induction member comprises at least one notch, wherein each of the at least one notch forms a receiving portion after the metallic induction member is wrapped with the plastic member.

25. The base of the easy-to-start motor adapted to be coupled with a rotor as claimed in claim 17, wherein each of the at least one magnetic attraction portion has a magnetic attraction face, wherein the plastic member forms at least one exposed portion corresponding to the at least one magnetic attraction portion, wherein each of the at least one exposed portion is aligned with the magnetic attraction face of a corresponding one of the at least one magnetic attraction portion, and wherein the magnetic attraction face protrudes from a surface of the plastic member via a corresponding one of the at least one exposed portion.

26. The base of the easy-to-start motor adapted to be coupled with a rotor as claimed in claim 17, wherein each of the at least one magnetic attraction portion has a magnetic attraction face, and wherein the magnetic attraction face of each of the at least one magnetic attraction portion is covered within the plastic member in an integral manner.

* * * * *